United States Patent
Mann et al.

(10) Patent No.: US 6,498,447 B2
(45) Date of Patent: Dec. 24, 2002

(54) APPARATUS AND METHOD FOR CONTROLLING AN ELECTRIC MACHINE

(75) Inventors: Raymond Mann, Keighley (GB); Austin Hughes, Leeds (GB); John Michael Stephenson, Halifax (GB)

(73) Assignee: Switched Reluctance Drives, Ltd., Harrogate (GB)

( * ) Notice: Subject to any disclaimer, the term of this patent is extended or adjusted under 35 U.S.C. 154(b) by 0 days.

(21) Appl. No.: 09/930,926

(22) Filed: Aug. 16, 2001

(65) Prior Publication Data

US 2002/0041168 A1 Apr. 11, 2002

(30) Foreign Application Priority Data

Aug. 18, 2000 (GB) ............................................. 0020501

(51) Int. Cl.$^7$ ................................................. H02P 7/06
(52) U.S. Cl. ...................... 318/254; 318/701; 318/702; 318/611; 318/629; 318/632
(58) Field of Search ................................. 318/611, 629, 318/632, 701, 254, 702

(56) References Cited

U.S. PATENT DOCUMENTS

| | | | | |
|---|---|---|---|---|
| 4,645,991 A | * | 2/1987 | Ban et al. ................... | 318/331 |
| 5,319,297 A | * | 6/1994 | Bahn ........................... | 318/701 |
| 5,461,295 A | | 10/1995 | Horst .......................... | 318/701 |
| 5,636,193 A | * | 6/1997 | Ohmi ........................... | 369/53 |
| 5,923,141 A | | 7/1999 | McHugh ...................... | 318/701 |
| 6,072,260 A | | 6/2000 | Randall ....................... | 310/216 |
| 6,093,993 A | | 7/2000 | McClelland ................. | 310/168 |
| 6,426,605 B1 | * | 7/2002 | Toliyat et al. .............. | 318/801 |

OTHER PUBLICATIONS

Sahoo et al., "Determination of current waveforms for torque ripple minimisation in switched reluctance motors using iterative learning: an investigation," Proc. IEE Electr. Power Appl., vol. 146, No. 4, Jul. 1999, pp. 369–377.

* cited by examiner

Primary Examiner—Robert E. Nappi
Assistant Examiner—Rina I. Duda
(74) Attorney, Agent, or Firm—Dicke, Billig & Czaja, P.A.

(57) ABSTRACT

A controller for an electronically commutated electrical machine receives a feedback signal indicative of a parameter which it is desired to minimize, e.g. torque ripple, current, voltage, vibration or acoustic noise. The controller computes the amplitude and phase of a set of harmonics in the parameter and sequentially injects harmonics of the correct amplitude and phase to minimize the parameter. An optimizing routine iterates through the set of harmonics to further reduce the parameter.

29 Claims, 2 Drawing Sheets

APPARATUS AND METHOD FOR CONTROLLING AN ELECTRIC MACHINE

CROSS-REFERENCE TO RELATED APPLICATION

The subject matter of this application is related to the subject matter of British Patent Application No. GB 0020501.3, priority to which is claimed under 35 U.S.C. § 119 and which is incorporated herein by reference.

BACKGROUND OF THE INVENTION

1. Field of the invention

Embodiments of the invention relate to the control of an electronically commutated machine in which it is desired to shape an output parameter, for example torque ripple, noise or vibration. The invention is particularly, though not exclusively, applicable to switched reluctance machines.

2. Description of Related Art

In general, a reluctance machine is an electrical machine in which torque is produced by the tendency of its movable part to move into a position where the reluctance of a magnetic circuit is minimized, i.e. where the inductance of the exciting winding is maximized. Typically, circuitry is provided for detecting the angular position of the rotor and energizing the phase windings as a function of the rotor position. This type of reluctance machine is generally known as a switched reluctance machine and may be operated as a motor or a generator. The characteristics of such switched reluctance machines are well known and are described in, for example, "The Characteristics, Design and Application of Switched Reluctance Motors and Drives" by Stephenson and Blake, PCIM'93, Nürnberg, Jun. 21–24, 1993, incorporated herein by reference. This paper describes in some detail the features of the switched reluctance machine which together produce the characteristic cyclically varying inductance of the phase windings.

It is known that particular attention has to be paid to some aspects of the design of such a machine to control the torque ripple and/or noise and/or vibration and/or output current or voltage produced by the machine. For example, U.S. Pat. No. 6,072,260 (Randall) and U.S. Pat. No. 6,093,993 (McClelland), both of which are incorporated herein by reference, describe ways of choosing physical dimensions of the machine to control noise and torque ripple.

However, it may not be possible to choose all the design parameters to give the best performance in these respects, since there may be other constraints on the design. In any case, once the machine is built, it is no longer possible to vary these design parameters.

Methods of modifying control parameters to influence the operation of the machine have been studied for many years. For example, U.S. Pat. No. 5,461,295 (Horst) and U.S. Pat. No. 5,923,141 (McHugh), both of which are incorporated herein by reference, use predetermined current profiles to reduce the noise emitted. These, and similar, methods are effective with machines of known characteristics. Applying methods of this type requires careful characterization of the machine in order to achieve the best results. Individual differences between machines can reduce the effectiveness of these methods.

Some researchers have used iterative techniques to deduce an exact relationship between the input (e.g. the phase current) and an output (e.g. the torque) of the machine. Numerical techniques are invoked since there is no analytical solution to this problem, and the solution is generally given in tabular form. One such approach is reported by Sahoo et al. in "Determination of current waveforms for torque ripple minimization in switched reluctance motors using iterative learning: an investigation", IEE Proceedings—Electric Power Applications, Vol. 146, No 4, July 99, pp. 369–377, which is incorporated herein by reference. However such a scheme requires large computing power, takes significant time to implement and is relatively inflexible, since the solution for one operating point will require recomputation for another. The same is true, in general, of schemes using artificial neural networks and neuro-fuzzy logic.

There is therefore a need for a method of control that is suitable for any electronically commutated machine and that does not require pre-knowledge of the characteristics of the machine. Preferably, such a method would be self-optimizing.

SUMMARY OF THE INVENTION

Embodiments of the invention analyze an output parameter of interest into two or more constituent harmonics and create an input signal to counter some or all of the analyzed harmonics in the machine output.

According to one embodiment of the invention, there is provided a closed-loop, self-optimizing controller for an electronically commutated machine that minimizes harmonic components in an output parameter by adjusting the magnitude and phase of harmonics in the input to the machine by treating each harmonic individually and in sequence. The sequence may be in ascending order of frequency. However, particularly significant components of the frequency spectrum of the parameter may be dealt with in preference to others by ordering them according to their magnitude, starting with the component with the largest magnitude. Preferably the controller includes an optimizing routine that iterates through the set of harmonic components to find an overall minimum torque ripple.

For a machine operating as a motor, the output parameter may be torque, vibration or acoustic noise, for example. For a machine operating as a generator, the output parameter may be current, voltage, vibration or acoustic noise, for example.

BRIEF DESCRIPTION OF THE DRAWINGS

Embodiments of the invention can be put into practice in a number of ways, some of which will now be described by way of example and with reference to the accompanying drawings, in which.

DETAILED DESCRIPTION OF PREFERRED EMBODIMENTS

For the purpose of illustration, the invention will be described with respect to embodiments that minimize torque ripple as the output. However, these embodiments should not be considered as a limitation of the method of control, since it will be made clear later how the invention can be used to equal effect in the minimization of vibration and acoustic noise. Similarly, the description will cover the machine acting as a motor. It will be clear that the same technique can be applied to a machine acting as a generator. In this case the output is current, voltage, vibration or acoustic noise.

As is well-known from the literature on switched reluctance machines and brushless dc machines, the output torque is not, in general, constant with rotor angle, i.e. the torque waveform contains periodic disturbances known as torque ripple. The frequency of the disturbances is proportional to the speed of the machine. If the machine is operating in the steady state, the alternating component of the output torque can therefore be analyzed in the frequency domain as a series of sine components where the frequencies are integer multiples of the basic excitation frequency of the machine. For example, a typical 3-phase switched reluctance machine with 12 stator poles and 8 rotor poles has a basic excitation frequency of 24 pulses per mechanical revolution of the rotor. The torque ripple frequencies (in Hz) are therefore 24, 48, 72, . . . multiplied by the mechanical speed (in rev/sec). When operated at 150 rev/min (2.5 rev/sec) on a 5 Nm load using the basic rectangular pulse of current typical of such operation, it produces torque ripple which can be measured by a conventional torque meter and analyzed by standard methods to give the spectral plot shown in FIG. 1. This shows the magnitudes of the harmonics present in the torque output of the machine.

A method of torque ripple reduction according to an embodiment of the invention includes adding a series of harmonic currents to the basic rectangular current reference which aims to create components of torque equal and opposite to the raw ripple torque waveform. The additional current injected according to this embodiment will have the form of Equation 1:

$$i(\theta)=\Sigma_{n=1}^{m}a_n \sin (k\, n\theta+\phi_n) \quad (1)$$

where $i(\theta)$ is a signal representative of input current, n is an integer, m is the number of harmonics considered, $\theta$ is the mechanical angle of the rotor, k is the basic number of pulses per rev, $\phi$ is an angular offset.

In the generating mode of the same machine, the equation is essentially the same, except that the input term $i(\theta)$ for current is replaced with a signal $T(\theta)$ representative of input torque.

Figure 2:
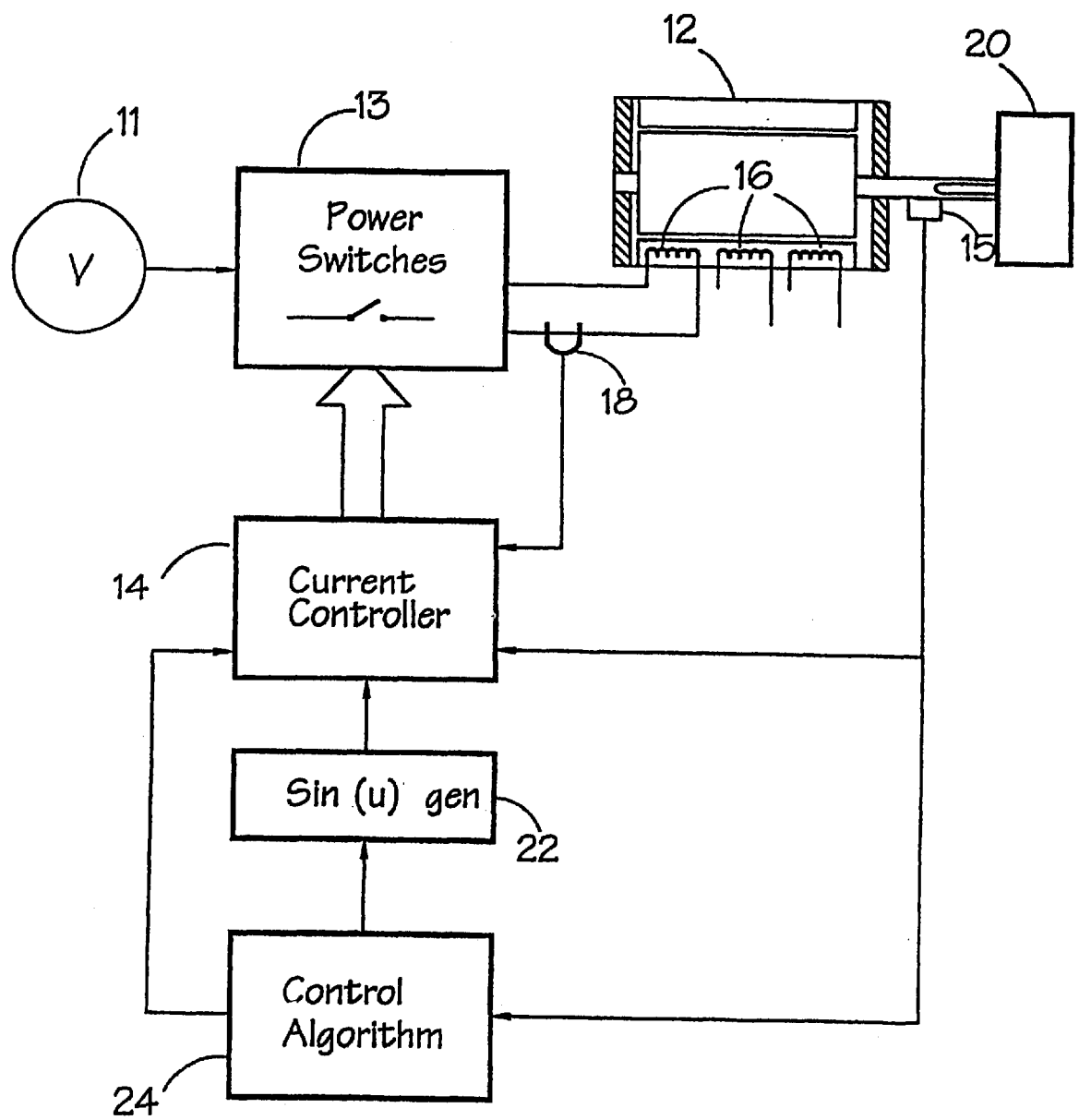
FIG. 2 shows a motor and control system according to an embodiment of the invention.

One controller that achieves this current waveform is shown in FIG. 2. The input DC power supply 11 can be either a battery or rectified and filtered AC mains, for example, and can be fixed or variable in magnitude. In some known drives, the power supply 11 includes a resonant circuit which produces a DC voltage which rapidly varies between zero and a predetermined value to allow zero voltage switching of power switches. The DC voltage provided by the power supply 11 is switched across the phase windings 16 of the machine 12 by a power converter 13 under the control of the current controller 14. The machine 12 is shown coupled to a load 20 which can be an energy, sink when the machine is acting as a motor and an energy source when the machine is acting as a generator. The switching of the windings 16 must be correctly synchronized to the angle of rotation of the rotor for proper operation of the drive. A rotor position detector 15 is traditionally employed to supply signals indicating the angular position of the rotor. The output of the rotor position detector 15 may also be used to generate a speed feedback signal.

The rotor position detector 15 may take many forms. It may take the form of hardware, for example, as shown schematically in FIG. 2, or it can comprise a software algorithm that calculates or estimates the position from other monitored parameters of the drive system. These systems are often called "sensorless position detector systems" since they do not use a physical transducer associated with the rotor which measures the position.

The current controller 14 also receives inputs from a current transducer 18 associated with each phase winding (only one transducer being shown for the sake of clarity), a control algorithm 24 and a sine-wave generator 22. The control algorithm 24 receives a signal indicative of rotor speed, from which it can deduce (by differentiation) the torque ripple that is responsible for speed variation. Alternatively, the torque ripple signal may be obtained from, say, a torque transducer that monitors the torque of the machine. The control algorithm then computes the harmonics of the spectrum of this ripple (corresponding to FIG. 1) and feeds back information about the amplitude of each of these to the current controller, one at a time. At the same time, the sine-wave generator 22 is instructed to generate sine components of the correct phase angle and correct frequency. These components are passed to the current controller 14, scaled to the appropriate amplitude and added to the conventional current reference signal as feedback to produce a current reference that produces a torque with reduced harmonic content.

Figure 1:
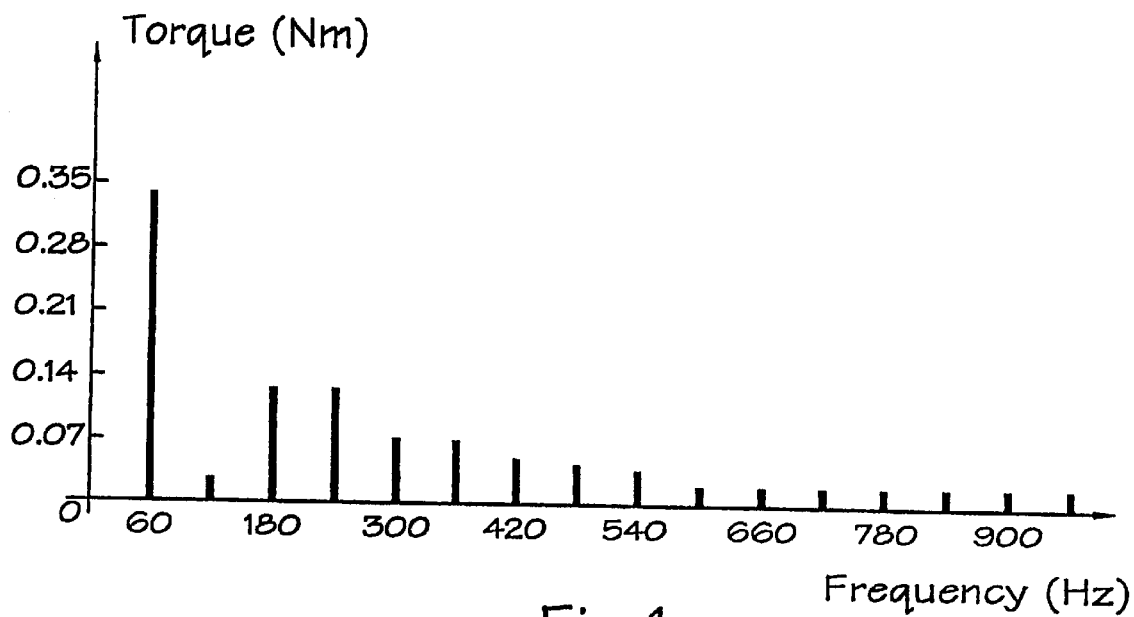
FIG. 1 shows a torque spectrum of a prior art machine.
Figure 3:
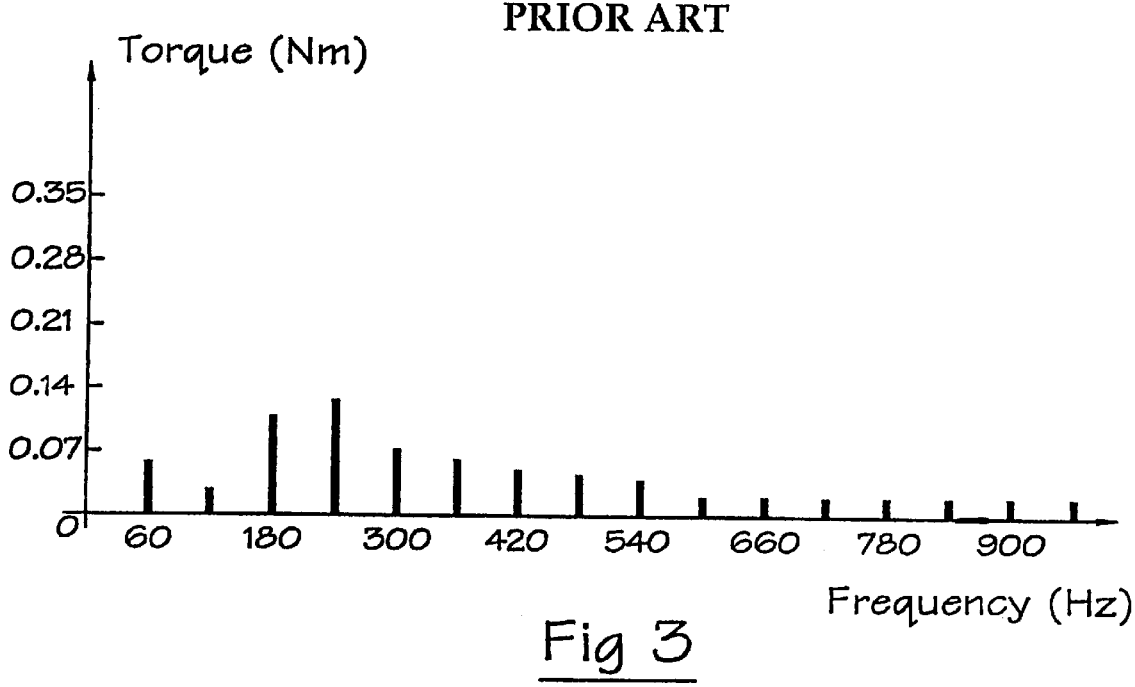
FIG. 3 shows a torque spectrum of a machine operation in accordance with one aspect of the invention.

For the example of the machine whose torque spectrum is shown in FIG. 1, the algorithm 24 deduces, for the operating point of FIG. 1, that the optimum values for the terms of Equation 1 for n=1 are:

$$i(\theta)=0.23\sin(24\theta+0.70)\,[A] \quad (2)$$

and using this one component to add to the standard current reference yields the new torque spectrum shown in FIG. 3.

As expected, this yields a large reduction in the 60 Hz component, confirming the validity of the basic approach. It should be noted, however, that despite the non-linearity of the system, there is very little influence on the other harmonics in the spectra, save a small reduction in the amplitude at 180 Hz. Bearing in mind the known difficulty of analyzing the switched reluctance system because of its non-linearities, this result is somewhat surprising. It has led the inventors to the realization that the components in the harmonic spectrum can be treated sequentially while the machine is running in steady state, so that the torque ripple can be minimized over a short period.

This approach is confirmed by operating the machine at 10 Nm output and using the algorithm 24 to deduce the best value of harmonic current to inject. This is shown to be:

$$i(\theta)=1.26\sin(24\theta+5.96)\,[A] \quad (3)$$

and has been shown to minimize the 60 Hz torque ripple without any significant change to the higher order components.

The question of the higher harmonics is now considered. Clearly, the number of harmonics to be taken into account has to be decided. It is clear that a very large number of terms will be impractical and would, in any case, bring an ever-decreasing reward in terms of improvement in the torque ripple. For the sake of illustration, five harmonic terms are selected here as a practical quantity to use. One skilled in the art will realize that this could be increased for better performance or reduced for lower cost and reduced improvement in torque ripple.

At an illustrative load of 7.5 Nm and 150 rev/min, the algorithm 24 is set to deduce, in sequence, the coefficients for the first five terms of equation 1. These are given as:

$$i(\theta)=0.8\sin(24\theta+5.93)+0.2\sin(48\theta+0.85)+0.16\sin(72\theta+2.44)+\\0.12\sin(96\theta+3.43)+0.03\sin(120\theta+4.00) \text{ [A]} \quad (4)$$

With changes to five harmonic components, a more comprehensive way of estimating the improvement in the torque waveform is required, rather than simply noting the reduction in amplitude of a part of a torque spectrum. It has been shown that a good method for achieving this is to compute the variance of the torque from an ideal (i.e. perfectly smooth) level. This is a well-known method of evaluation in the field of ripple control. In this case, the variance of the raw torque waveform is 0.590 and that of the modified waveform with five terms applied, i.e. as in Equation 4, is 0.022, i.e. a reduction factor of almost 27. (Using only one term applied, as in Equation 3, gives a reduction factor of around 4.)

A further small improvement can be found by iteration, i.e. by allowing algorithm 24 to sequentially produce the coefficients for the first (say) five terms and then repeating the exercise of minimizing each one in turn while the others are held constant.

The above description has covered embodiments of the invention that minimize the ripple in output torque. It will be clear, however, that the system can be adapted to control ripple in other output quantities. For example, by feeding back a signal indicative of vibration, the harmonics contained in that signal can be deduced and the correct amplitudes and phase angles computed to modify the current waveform. The coefficients for the harmonic terms can be found by algorithm 24 in exactly the same way as described for minimization of torque.

Similarly, a signal indicative of acoustic noise could be fed back so that harmonics in that spectrum could be minimized, giving an overall reduction in the noise emitted from the machine.

Those skilled in the art will appreciate that the invention can be used with a drive ab initio or as a retrofitted item on an existing drive, since it does not depend on any particular feature having to be specially incorporated into the design of the drive.

The skilled person will appreciate that variation of the disclosed arrangements is possible without departing from the invention. Accordingly, the above description of several embodiments is made by way of example and not for the purposes of limitation. As well as running the machine as a generator instead of a motor, it will be clear to the skilled person that minor modifications can be made to the apparatus and method described above. The present invention is intended to be limited only by the spirit and scope of the following claims.

What is claimed is:

1. A method of counteracting a deviation in an output of an electrical machine, the method including:
   deducing the magnitude and phase of at least two harmonics of the deviation in the output to produce signals indicative of the deduced harmonics;
   deriving feedback signals from the deduced harmonics; and
   sequentially injecting the feedback signals into an input of the electrical machine so as to reduce the magnitude of the deviation.

2. A method as claimed in claim 1 in which each feedback signal causes a harmonic substantially in antiphase to one of the deduced harmonics of the deviation in the output.

3. A method as claimed in claim 1 in which harmonic components in the output are reduced by adjusting the magnitude and phase of signals indicative of the deduced harmonics to derive the feedback signals and injecting the feedback signals into the input of the machine.

4. A method as claimed in claim 1 in which each of a predetermined number of harmonics of the deviation in the output are reduced in sequence.

5. A method as claimed in claim 4 in which the feedback signals are injected into the input in ascending order of frequency of the deduced harmonics.

6. A method as claimed in claim 4 in which the feedback signals are injected into the input in descending order of magnitude of the deduced harmonics.

7. A method as claimed in claim 1, including iteratively deducing the magnitude and phase of each harmonic and injecting the feedback signals into the input further to reduce the deviation.

8. A method as claimed in claim 1, in which the machine is operating as a motor and the output is torque, vibration or acoustic noise.

9. A method as claimed in claim 8, in which the machine is a rotary machine having a rotor revolving relative to a stator and having at least one energizable winding, and in which the input represents a current for energizing the winding, the method further comprising injecting the feedback signals according to the formula:

$$i(\theta)=\Sigma_{n=1}^{m}a_n \sin(k\,n\theta+\phi_n)$$

where: i is a signal representative of the input current,
n is an integer,
m is the number of harmonics considered,
θ is the mechanical angle of the rotor,
k is the basic number of pulses per rev, and
φ is an angular offset.

10. A method as claimed in claim 1 in which the machine is operating as a generator and the output is current, voltage, vibration or acoustic noise.

11. A method as claimed in claim 10 in which the machine is a rotary machine having a rotor revolving relative to a stator and having at least one energizable winding, and in which the input represents a torque for driving the rotor, the method further comprising injecting the signals according to the formula:

$$T(\theta)=\Sigma_{n=1}^{m}a_n \sin(k\,n\theta+\phi_n)$$

where T(θ) is a signal representative of the input torque,
n is an integer,
m is the number of harmonics considered,
θ is the mechanical angle of the rotor,
k is the basic number of pulses per rev, and
φ is an angular offset.

12. A controller for an electrical machine, the controller comprising:
   means for deducing sequentially the magnitude and phase of at least two harmonics of a deviation in an output of the machine to produce signals indicative of the deduced harmonics;
   means for deriving feedback signals from the signals indicative of the deduced harmonics; and
   means for controlling the machine in response to the feedback signals so as to reduce the magnitude of the deviation.

13. A controller as claimed in claim 12 in which the means for controlling is operable to cause harmonics substantially in antiphase to at least one of the deduced harmonics of the deviation in the output.

14. A controller as claimed in claim 13 in which the means for controlling is operable to reduce the harmonic components in the output by adjusting the magnitude and phase of signals indicative of the deduced harmonics to derive the feedback signals and injecting the feedback signals into an input of the machine.

15. A controller as claimed in claim 12 in which the means for deducing is operable to deduce a predetermined number of harmonics of the deviation in sequence.

16. A controller as claimed in claim 15 in which the means for controlling is operable to inject the feedback signals into an input of the machine in ascending order of frequency of the harmonics.

17. A controller as claimed in claim 15 in which the means for controlling is operable to inject the feedback signals into an input of the machine in descending order of magnitude of the harmonics.

18. A controller as claimed in claim 12 in which the means for deducing is operable to iteratively deduce the magnitude and phase of the harmonics to produce a modified feedback signal.

19. A controller as claimed in claim 18 in which the means for controlling is responsive to the feedback signal from each iteration to inject the signals into the machine further to reduce the deviation.

20. A controller as claimed in claim 12 in which the means for deducing is operable to deduce the magnitude and phase of the deviation of one of torque, current, voltage, vibration and acoustic noise of the machine as the output.

21. A controller as claimed in claim 12 in which the machine is a rotary machine, having a rotor revolving relative to a stator, and having an energizable winding, and in which the means for controlling is operable to inject the feedback signals into an input of the machine according to the formula:

$$i(\theta) \text{ or } T(\theta) = \Sigma_{n=1}^{m} a_n \sin(k\, n\theta + \phi_n)$$

where: $i(\theta)$ is a signal representative of input current,
$T(\theta)$ is a signal representative of input torque,
n is an integer,
m is the number of harmonics considered,
$\theta$ is the mechanical angle of the rotor,
k is the basic number of pulses per rev, and
$\phi$ is an angular offset.

22. A controller as claimed in claim 12 in which the means for deducing comprises means for determining the magnitude of the deviation in the output and means for generating a sine wave corresponding to each of the deduced harmonics, the means for controlling being operable to create the feedback signal by combining a sinusoidal signal corresponding to each harmonic having a magnitude corresponding to the harmonic and to combine the feedback signal with reference input of the machine.

23. An electric machine system including a controller as claimed in claim 12.

24. A switched reluctance machine system including a controller as claimed in claim 12.

25. A controller for an electrical machine, the controller comprising:
   a deducer constructed and arranged to sequentially deduce the magnitude and phase of at least two harmonics of a deviation in an output of the machine to produce signals indicative of the deduced harmonics;
   a deriver constructed and arranged to derive feedback signals from the signals indicative of the deduced harmonics; and
   a controller constructed and arranged to control the machine in response to the feedback signals so as to reduce the magnitude of the deviation.

26. A controller as claimed in claim 25, in combination with a switched reluctance motor as the electrical machine.

27. A controller as claimed in claim 25, in combination with a switched reluctance generator as the electrical machine.

28. A controller as claimed in claim 25, in combination with a rotary machine as the electrical machine, the rotary machine having a rotor revolving relative to a stator and having an energizable winding, wherein the controller is operable to inject the feedback signals into an input of the machine according to the formula:

$$i(\theta) \text{ or } T(\theta) = \Sigma_{n=1}^{m} a_n \sin(k\, n\theta + \phi_n)$$

where: $i(\theta)$ is a signal representative of input current,
$T(\theta)$ is a signal representative of input torque,
n is an integer,
m is the number of harmonics considered,
$\theta$ is the mechanical angle of the rotor,
k is the basic number of pulses per rev, and
$\phi$ is an angular offset.

29. A method of counteracting a deviation in an output of an electrical machine, the method including:
   deducing the magnitude and phase of at least two harmonics of the deviation in the output to produce signals indicative of the deduced harmonics;
   deriving feedback signals from the deduced harmonics; and
   sequentially injecting the feedback signals into an input of the electrical machine so as to reduce the magnitude of the deviation;
   wherein each feedback signal causes a harmonic substantially in antiphase to one of the deduced harmonics of the deviation in the output;
   wherein harmonic components in the output are reduced by adjusting the magnitude and phase of signals indicative of the deduced harmonics to derive the feedback signals and injecting the feedback signals into the input of the machine;
   wherein each of a predetermined number of harmonics of the deviation in the output are reduced in sequence; and
   wherein the machine is a rotary machine having a rotor revolving relative to a stator and having at least one energizable winding, and in which the input represents a current for energizing the winding, the method further comprising injecting the feedback signals according to the formula:

$$i(\theta) = \Sigma_{n=1}^{m} a_n \sin(k\, n\theta + \phi_n)$$

where: i is a signal representative of the input current,
n is an integer,
m is the number of harmonics considered,
$\theta$ is the mechanical angle of the rotor,
k is the basic number of pulses per rev, and
$\phi$ is an angular offset.

* * * * *